(12) United States Patent  (10) Patent No.: US 8,283,647 B2
Shamir et al.  (45) Date of Patent: Oct. 9, 2012

(54) DEVELOPER LIQUID LEVEL SENSOR (75) Inventors: Kalman Shamir, Herzlia (IL); Moshe Marom, Kfar Saba (IL)

(73) Assignee: Eastman Kodak Company, Rochester, NY (US)

( * ) Notice: Subject to any disclaimer, the term of this patent is extended or adjusted under 35 U.S.C. 154(b) by 618 days.

(21) Appl. No.: 12/507,184

(22) Filed: Jul. 22, 2009

(65) Prior Publication Data
US 2011/0016969 A1    Jan. 27, 2011

(51) Int. Cl.
*G01F 23/00* (2006.01)
(52) U.S. Cl. ........................ 250/577; 396/578
(58) Field of Classification Search .......... 250/577; 396/578
See application file for complete search history.

(56) References Cited

U.S. PATENT DOCUMENTS
6,012,795 A    1/2000 Saito et al.
2002/0185619 A1* 12/2002 Benton ................. 250/577

FOREIGN PATENT DOCUMENTS
DE  103 60 710 A1  10/2005
JP  57 182622 A  11/1982
JP  62 138726 A   6/1987
WO  WO 99/26044 A1  5/1999

* cited by examiner

*Primary Examiner* — Seung C Sohn
(74) *Attorney, Agent, or Firm* — Nelson Adrian Blish (57) ABSTRACT

An apparatus for detecting developer liquid (108) level in a plate developer section tank (104) includes a reflective surface (204) installed on at least on one edge of the developer tank; a light emitter (232) which emits light onto the reflective surface; a light detector (236) adapted to detect reflected light from the reflective surface, wherein the light emitter and the light detector are positioned relative to the reflective surface such that the emitted light from the light emitter is deflected by the developer liquid hitting the reflective surface at 90 degrees.

7 Claims, 7 Drawing Sheets

DEVELOPER LIQUID LEVEL SENSOR

CROSS REFERENCE TO RELATED APPLICATIONS

Reference is made to commonly-assigned U.S. patent application Ser. No. 12/371,667, (now U.S. Pat. No. 7,854, 558) filed Feb. 16, 2009, entitled DEVELOPER WASTE REUSE, by Marom et al., the disclosure of which is incorporated herein.

FIELD OF THE INVENTION

This present invention relates to an apparatus and method for sensing developer liquid level in a plate developer tank.

BACKGROUND OF THE INVENTION

Lithographic digital printing plates are imaged on special opto-mechanical plate setters. The imaged plates undergo a chemical development stage and this process is usually performed by a plate developing processor device. The development process uses chemical development material in a liquid form. The material is filled into the developer section tank 104 within the plate processor device, as shown in prior art FIG. 1.

Figure 1:
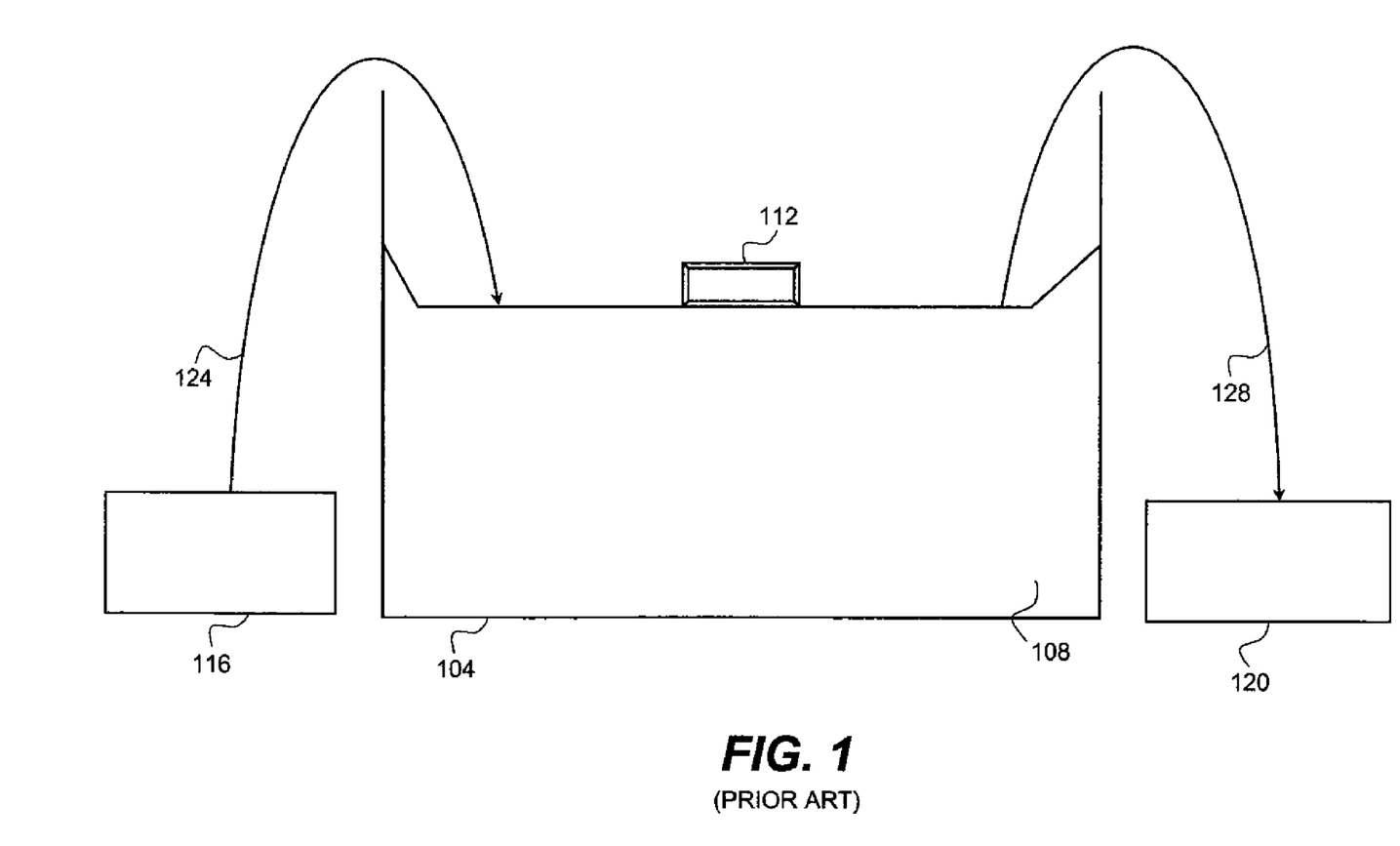
FIG. 1 is a prior art schematic illustration of a developer liquid tank with a float sensor.

After a lithographic plate is imaged, it is be transported through the plate processor device for processing, consuming a portion of the development liquid in developer section tank 104. The developer liquid 108 inside developer section tank 104 should be maintained at fixed level. In prior art devices, the fixed level is maintained by the use of a float sensor 112, which floats on developer liquid 108, to indicate the level of the developer liquid. After each plate development cycle, new developer liquid is replenished from fresh developer container 116 via developer replenish pipe system 124. The new developer material from fresh developer container 116 will flow into developer section tank 104, maintaining the developer liquid 108 level. In order to keep developer liquid 108 level fixed, part of the developer liquid from developer section tank 104 will be drained into the developer waste container 120, via developer waste overflow pipe system 128.

The invention disclosed hereunder, proposes a more accurate measurement apparatus and method in order to keep the level of developer liquid 108 at a fixed level, which is necessary for achieving reliable results during plate development process.

SUMMARY OF THE INVENTION

Briefly, according to one aspect of the present invention an apparatus for detecting developer liquid level in a plate developer tank includes a reflective surface installed on at least on one edge of the developer tank, a light emitter configured to emit light onto the reflective surface, a light detector adapted to detect back reflected light from the reflective surface, wherein the light emitter and the light detector are positioned relative to the reflective surface so that the emitted light from the light emitter is reflective to the detector when covered by the developer liquid, and hits the reflective surface at 90 degrees.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
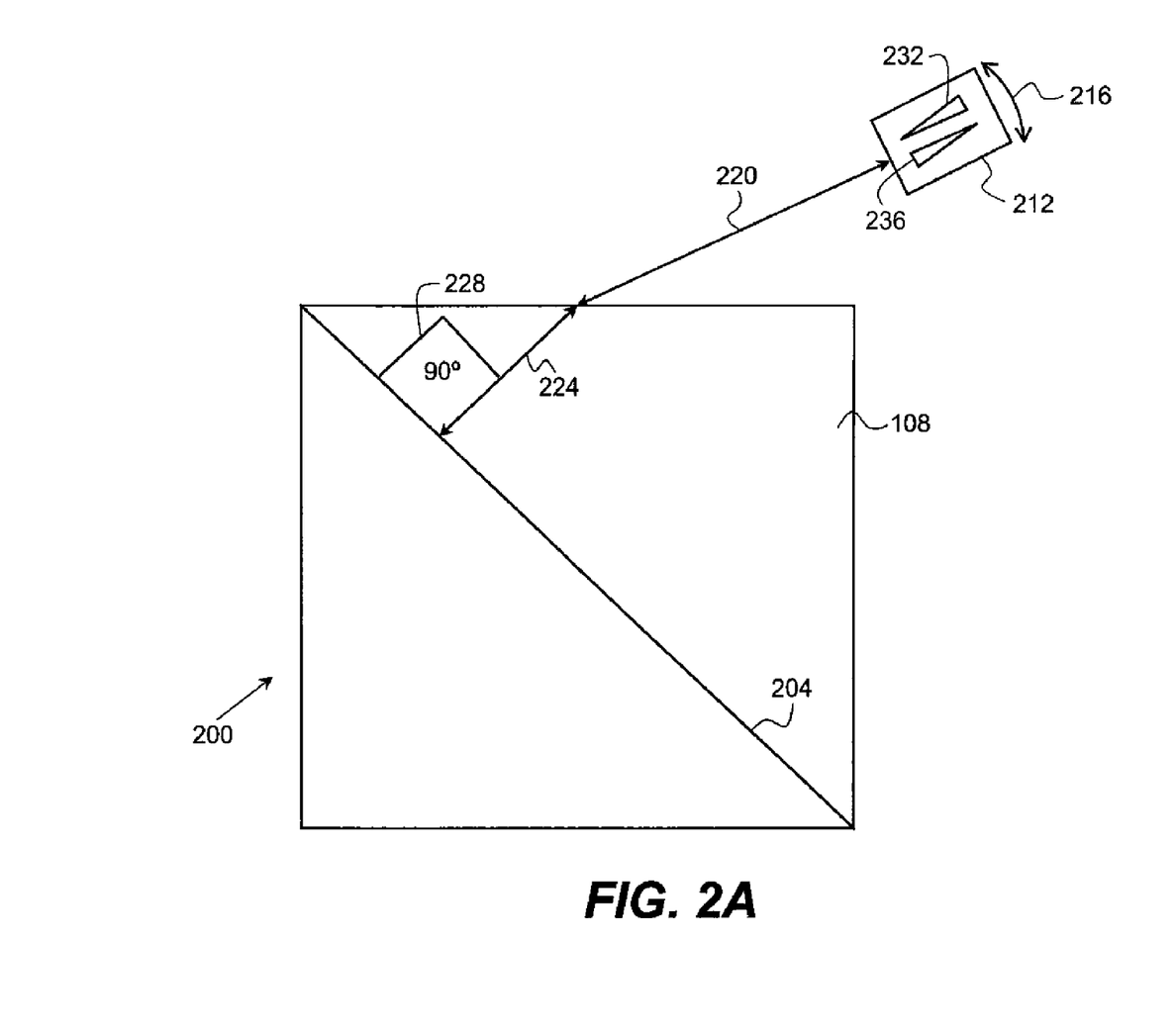
FIG. 2A is a schematic illustration of a developer liquid sensor detecting an instance of a full tank with developer liquid and where the emitter and detector are co-located.

FIG. 2A shows a developer liquid level sensor 200. Sensor 200 will be integrated into developer section tank 104, replacing an existing sensor, such as float sensor 112. Sensor 200 includes sensor element 212 positioned above the developer liquid 108 in tank 104, and a reflective surface 204 installed on at least one of the walls of tank 104. Reflective surface 204 is immersed in developer liquid 108 when the tank is full. Sensor element 212 is adapted to emit light beam 220 onto reflective surface 204.

In operation, sensor element 212 will emit a light beam from light emitter 232 in direction 220 towards reflective surface 204. The light beam travelling in direction 220 hits developer liquid 108 before it will reach the reflective surface 204. This case is presented in FIG. 2A, the light beam 220 hits the surface of developer liquid 108, and the beam direction is deflected by a certain refraction angle to continue in a new beam direction 224. The deflection occurs due to different refractive indexes of the air medium and the liquid medium, as is well known from Snell's law.

The reflected light from reflective surface 204 returns back to sensor element 212 in exactly the same path (224, 220) if the emitted light hits reflective surface 204 at an angle of 90 degrees (228). Sensor element 212 is equipped with light detector 236, adapted to detect the reflected light 224, which retracted in direction 220. In this case where the light is retraced in direction 220, and is detected by light detector 236 (which is co-located with emitter 232) will indicates that there is enough developer liquid 108 in tank 104.

In order to make sure that the emitted light beam from sensor element 212 will hit reflective surface 204 in 90 degrees the following steps should be performed, for calibrating sensor 200:

1. Make sure that reflective surface 204 is fully immersed in developer liquid 108.
2. Apply light from sensor element 212 towards reflective surface 204.
3. Adjust the position of sensor element 212 by adjusting sensor axis 216 until light detector detects the reflected light.
4. In this stage sensor element 212 position is secured for further operation.

The described sensor calibration process should be repeated each time that a new type of developer liquid 108 is used. This is due to a possibility that the new liquid might have a different refractive index.

Figure 3A:
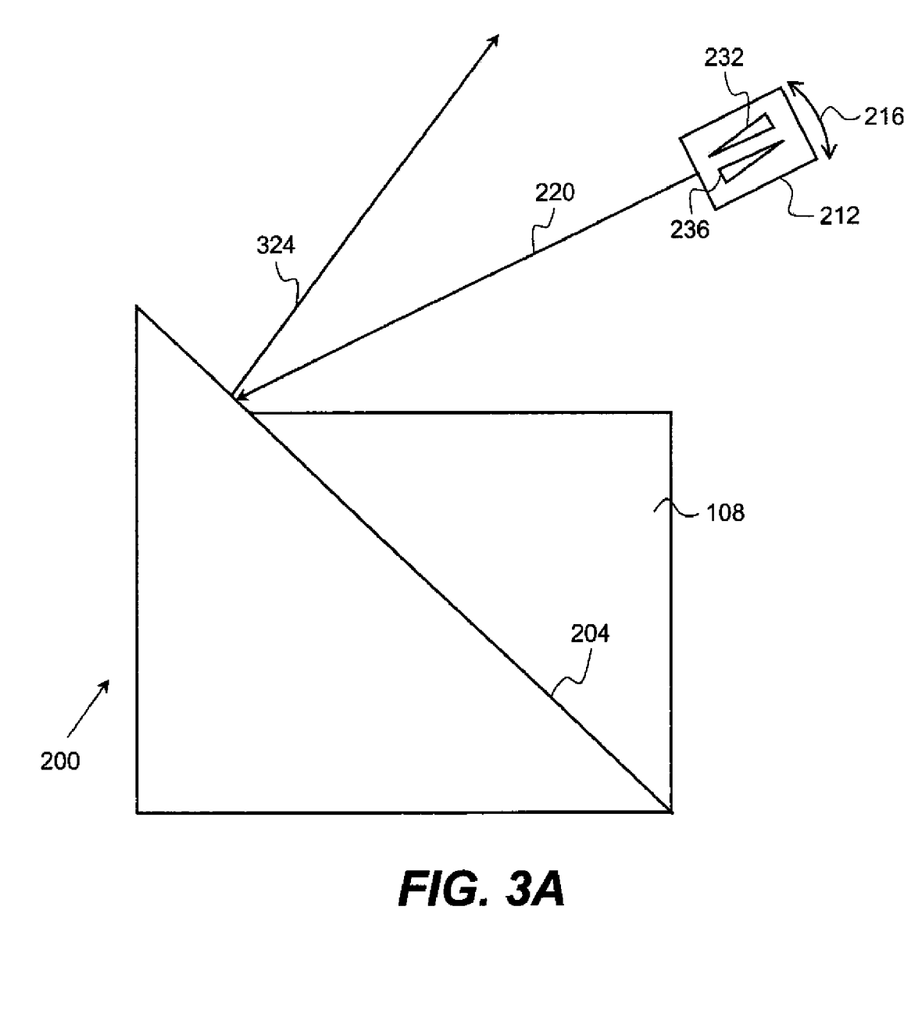
FIG. 3A is a schematic illustration of a developer liquid sensor detecting an instance of developer liquid deficit in the developer tank and where the emitter and detector are co-located.

FIG. 3A is similar to FIG. 2A, but it shows developer liquid 108 depleted to a level that fresh developer liquid is needed to be replenished into tank 104. The light beam emitted from light emitter 232 hits reflective surface 204 in direction 220. Since the level of developer liquid 108 is low, the emitted light traveling in direction 220 will not hit developer liquid surface 108 and hence will not be refracted. The emitted light hits reflective surface 204 at less than 90 degrees and is be reflected from reflective surface 204 in direction 324, and hence does not reach light detector 236. This indicates that there is not enough developer liquid 108 in tank 104, triggering fresh developer liquid replenishment.

Figure 2B:
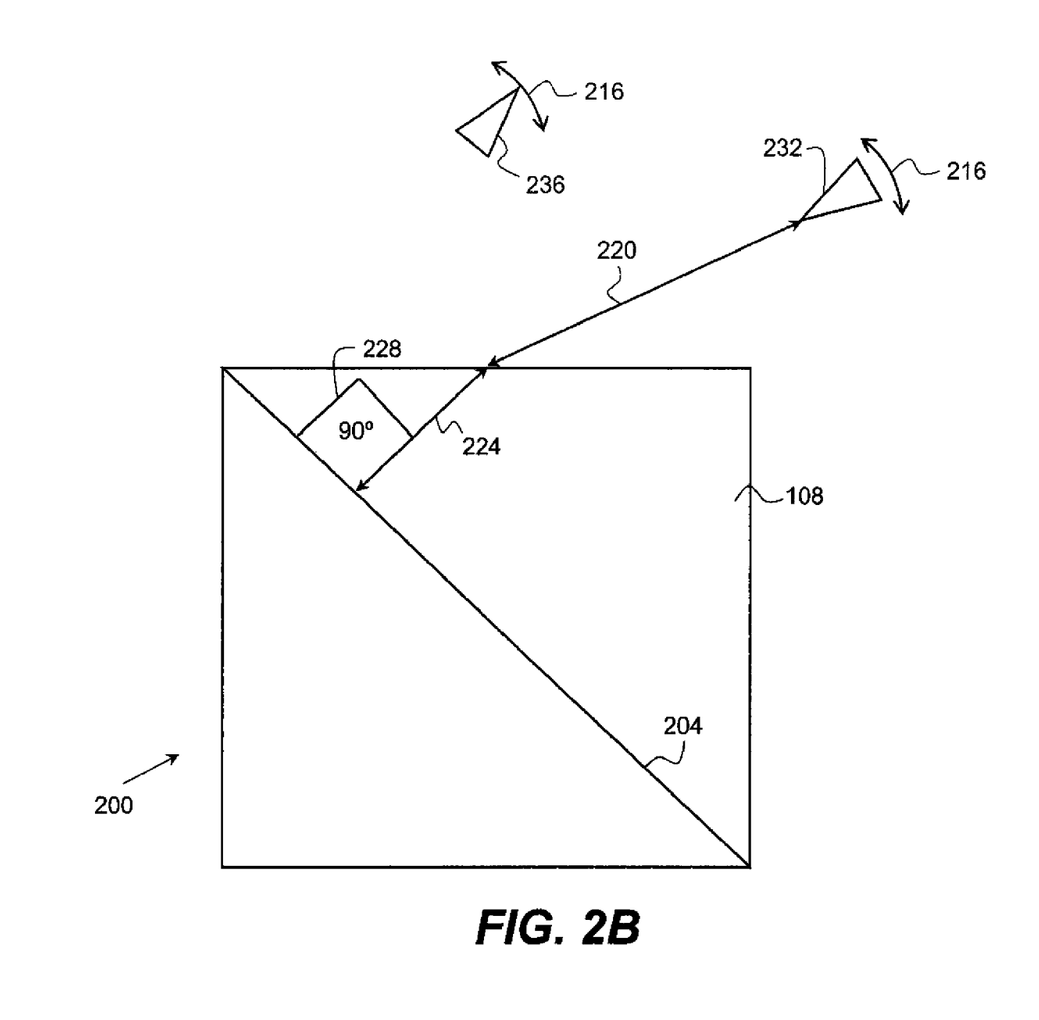
FIG. 2B is a schematic illustration of a developer liquid sensor detecting an instance of a full tank with developer liquid and where the emitter and detector are not co-located.
Figure 3B:
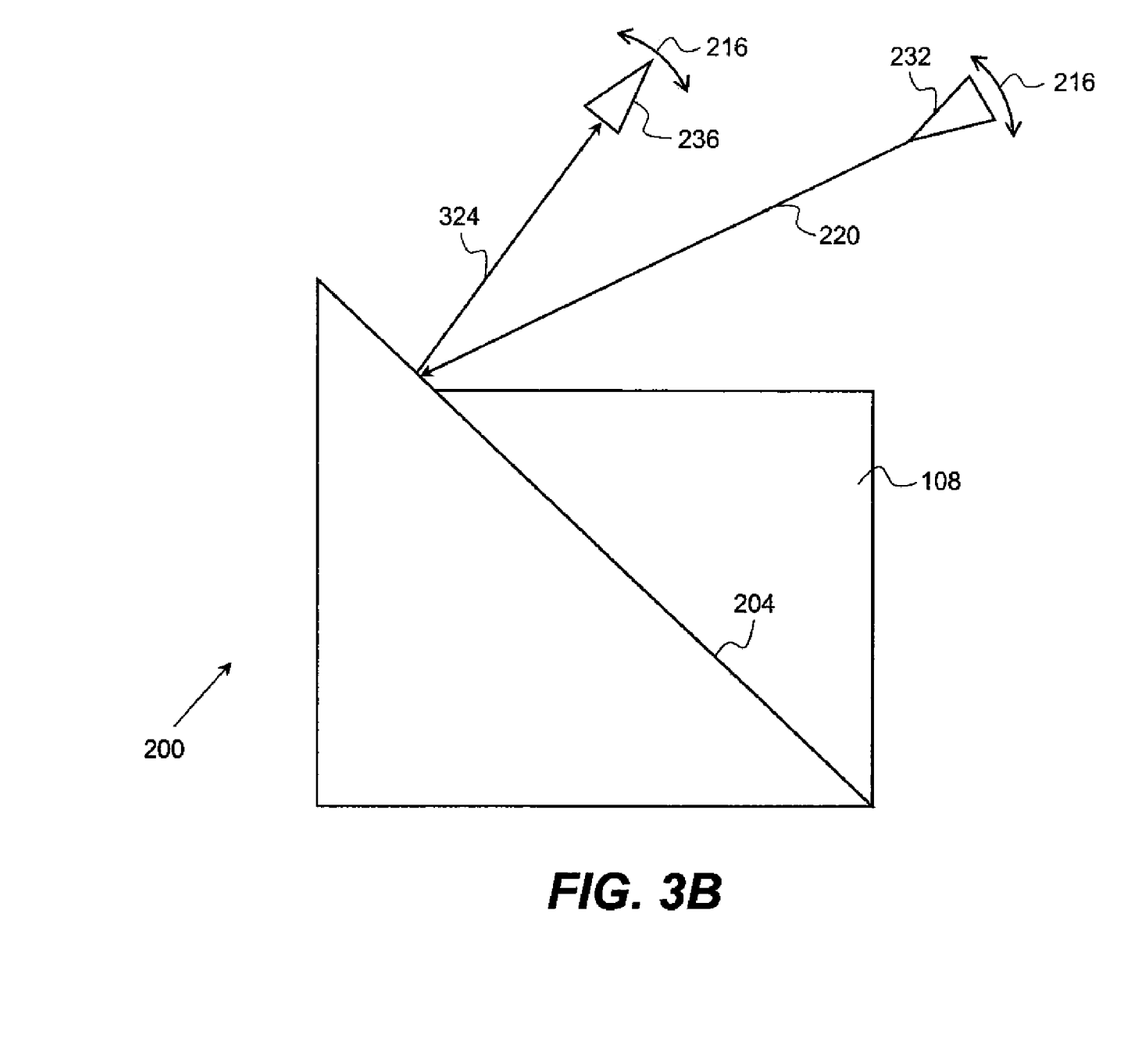
FIG. 3B is a schematic illustration of a developer liquid sensor detecting an instance of developer liquid deficit in the developer tank and where the emitter and detector are not co-located.

FIGS. 2B and 3B show a similar embodiment depicted by FIGS. 2A and 3A, respectively. FIGS. 2B and 3B show light detector 236 which is not co-located with light emitter 232 and is positioned in the direction of light path 324. In this case, when light detector 236 detects a retraced light in direction 324 (as is shown in FIG. 3B), it will indicate that there is not enough developer liquid 108 in tank 104. In the case where, light detector 236 does not detect a retraced light in direction 220 (as is shown in FIG. 2B), this will indicate that there is enough developer liquid 108 in tank 104.

Figure 4:
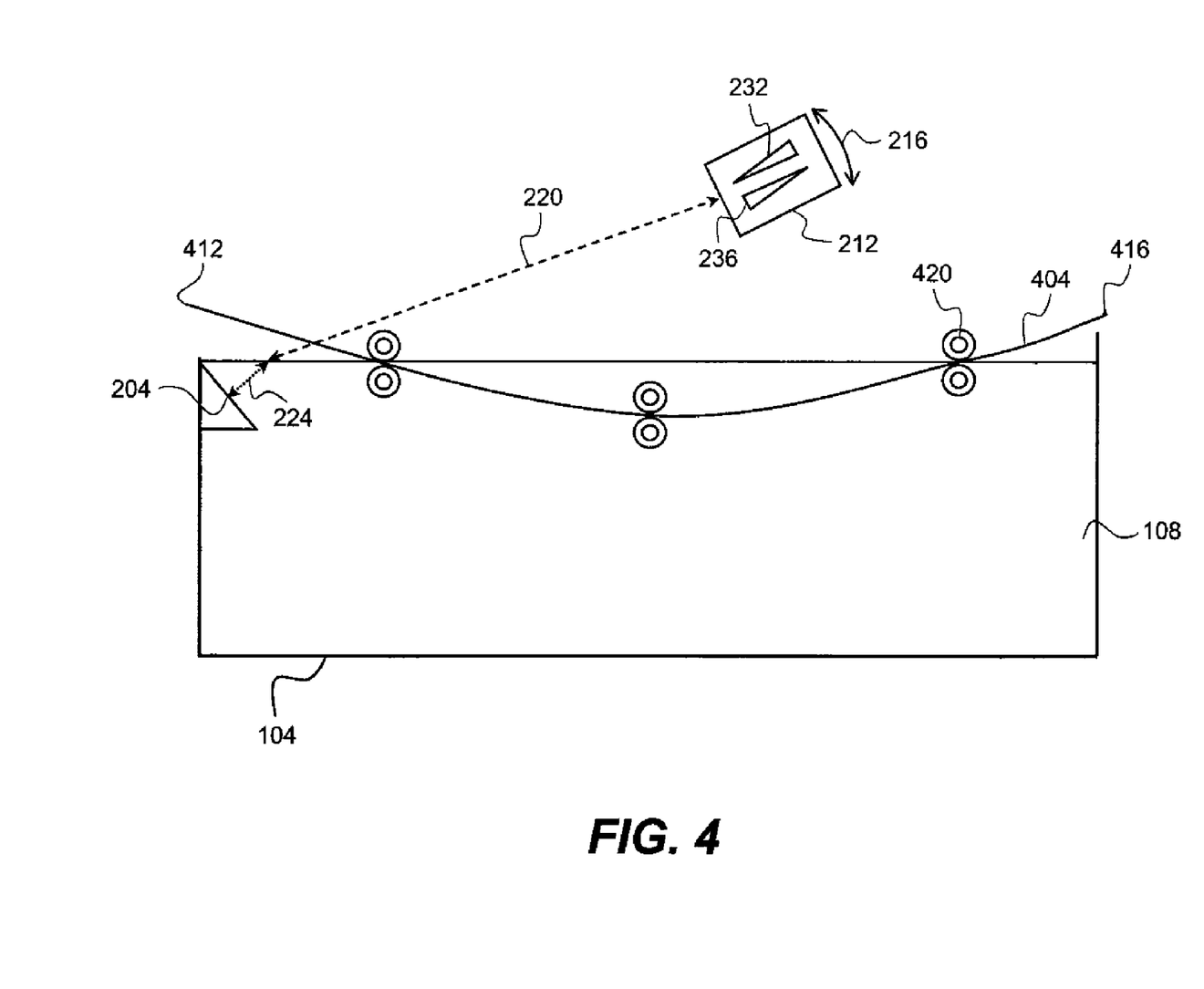
FIG. 4 is a schematic illustration of a developer tank showing a plate being developed and a sensor level detecting an instance of a full tank with developer liquid.
Figure 5:
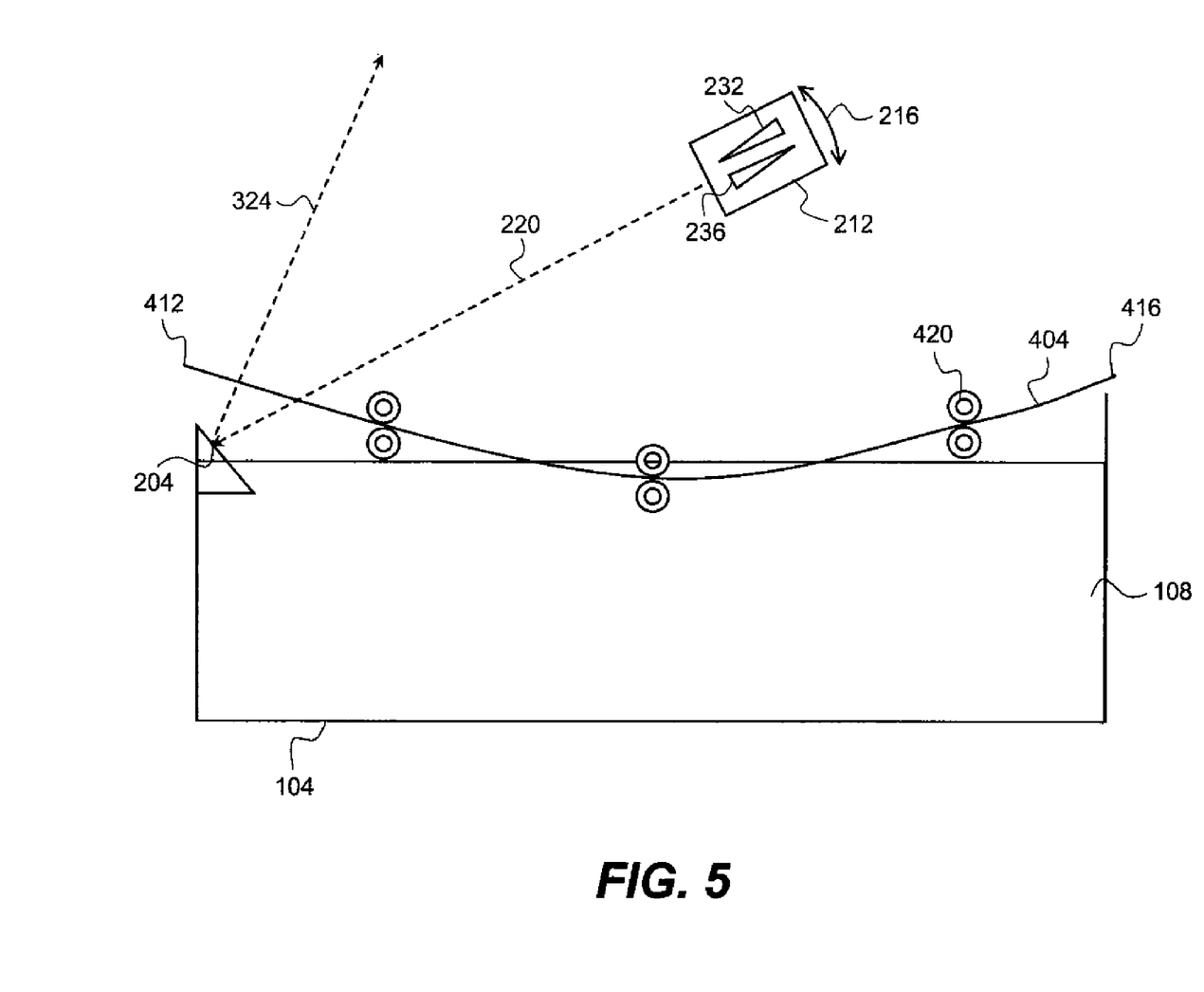
FIG. 5 is a schematic illustration of a developer tank showing a plate being developed and a sensor level detecting an instance of developer liquid deficit in the developer tank.

FIG. 4 and FIG. 5 show sensor element 212 and reflective surface 204 integrated in a plate development system. Printing plate enters the plate developer tank at plate entry point 412. The plate is immersed in developer liquid 108 and is transported by a set of transport rollers 420 along the plate path 404 through the developer liquid to the plate's exit point 416. The plate development process consumes developer liquid, which should be replenished in order to keep the right level of developer liquid 108 needed for proper and consistent plate development operation.

FIG. 4 illustrates the operation of sensor element 212 integrated in a plate developer system, and showing an instance where normal developer liquid 108 level condition is detected by light detector 236. FIG. 5 on the other hand shows an instance where there is a deficit of developer liquid 108 in the plate developer system.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

The invention has been described in detail with particular reference to certain preferred embodiments thereof, but it will be understood that variations and modifications can be effected within the scope of the invention.

Parts List

- 104 developer section tank
- 108 developer liquid
- 112 float sensor
- 116 fresh developer container
- 120 developer waste container
- 124 replenish pipe system
- 128 waste overflow pipe system
- 200 developer liquid level sensor
- 204 reflective surface
- 212 sensor element
- 216 sensor adjustment axis
- 220 path of emitted light beam from/to sensor
- 224 deflected path of light 220 after hitting liquid surface
- 228 reflection angle of 90 degrees for the lights beams 224/220 to be detected by sensor 212
- 232 light emitter, part of sensor 212
- 236 light detector, part of sensor 212
- 324 light path as reflected from surface 204 in air medium
- 404 plate transport path
- 412 plate entry point
- 416 plate exit point
- 420 transport roller

The invention claimed is:

1. An apparatus for detecting liquid level in a tank comprising:
   a reflective surface installed on at least on one edge of said tank;
   a light emitter configured to emit light onto said reflective surface;
   a light detector adapted to detect light reflected from said reflective surface; and
   wherein said light emitter and said light detector are co-located and emitted light strikes said reflective surface at 90 degrees and wherein light reflected from said reflective surface hits said detector when said reflective surface is covered by liquid.

2. The apparatus according to claim 1 wherein light is not reflected to said light detector when liquid in said developer does not cover said reflective surface.

3. The apparatus according to claim 1 wherein said back reflected light is detected by said light detector indicates an acceptable level of said liquid in said tank.

4. A method for detecting liquid level in a plate developer tank equipped with a reflective surface on at least one edge of said tank comprising the steps:
   calibrating position of a light emitter adapted to emit light on said reflective surface and light detector adapted to detect back reflected light from said reflective surface relative to said reflective surface in a manner that the emitted light from said light emitter is deflected by said developer liquid will hit said reflective surface at 90 degrees;
   placing a reflective surface in said tank at a position which indicates a full tank;
   emitting light from a light emitter on said reflective surface; and positioning a light detector so that light reflected from said reflective surface will reach said light detector when said reflective surface is covered by liquid.

5. An apparatus for detecting liquid level in a tank comprising:
- a reflective surface installed on at least on one edge of said tank;
- a light emitter configured to emit light onto said reflective surface;
- a light detector adapted to detect light reflected from said reflective surface; and wherein said light emitter and said light detector are not co-located and are positioned relative to said reflective surface so that emitted light from said light emitter will hit said detector when said reflective surface is not covered by liquid.

6. An apparatus according to claim 5 wherein said liquid is developer liquid.

7. An apparatus according to claim 5 wherein said emitter and detector are co-located.

* * * * *